US008725859B2

(12) United States Patent
White et al.

(10) Patent No.: US 8,725,859 B2
(45) Date of Patent: May 13, 2014

(54) SERVICE NETWORK DISCOVERY

(75) Inventors: Christopher J. White, Boston, MA (US); Dimitri Stratton Vlachos, Lexington, MA (US); David Paul Doyle, Somerville, MA (US)

(73) Assignee: Riverbed Technology, Inc., San Francisco, CA (US)

( * ) Notice: Subject to any disclaimer, the term of this patent is extended or adjusted under 35 U.S.C. 154(b) by 215 days.

(21) Appl. No.: 13/250,200

(22) Filed: Sep. 30, 2011

(65) Prior Publication Data

US 2013/0086249 A1 Apr. 4, 2013

(51) Int. Cl.
G06F 15/173 (2006.01)
G06F 15/16 (2006.01)

(52) U.S. Cl.
USPC .......... 709/223; 709/224; 709/249; 709/251; 709/252; 709/253

(58) Field of Classification Search
USPC ......... 709/224, 220, 223, 249, 251, 252, 253; 713/153; 370/254, 392; 715/735, 810
See application file for complete search history.

(56) References Cited

U.S. PATENT DOCUMENTS

| | | | | |
|---|---|---|---|---|
| 6,456,306 | B1* | 9/2002 | Chin et al. | 715/810 |
| 6,470,388 | B1* | 10/2002 | Niemi et al. | 709/224 |
| 7,200,651 | B1* | 4/2007 | Niemi | 709/223 |
| 8,077,718 | B2* | 12/2011 | Mortier et al. | 370/392 |
| 2003/0033402 | A1* | 2/2003 | Battat et al. | 709/224 |
| 2003/0041238 | A1* | 2/2003 | French et al. | 713/153 |
| 2003/0145069 | A1* | 7/2003 | Lau et al. | 709/220 |
| 2005/0169193 | A1* | 8/2005 | Black et al. | 370/254 |
| 2006/0031768 | A1* | 2/2006 | Shah et al. | 715/735 |

* cited by examiner

Primary Examiner — Le H Luu
(74) Attorney, Agent, or Firm — Park, Vaughan, Fleming & Dowler LLP

(57) ABSTRACT

An automated service discovery and monitoring utility employs automatically generated policies (rules) for monitoring network health of a service based on network discovery using flow data derived from transmissions sent over segments between computing components defining the service. An interactive discovery application employs flow data based on transmissions associated with a service. Analysis of the flow data identifies associated components from inspection of the transmissions. Iterative component selection allows network traversal of components based on flow data of the segments used for providing the service. The interactive service discovery therefore identifies associated components (servers) and segments based on flow data, rather than topology, rendering the flow data to allow a user to make an informed selection of segments and components for inclusion in a service, and generates a set of policies (rules) based on the discovered service dependencies for monitoring various metrics for the components providing the monitored service.

25 Claims, 9 Drawing Sheets

SERVICE NETWORK DISCOVERY

BACKGROUND

In a computing services environment, users gain access to services through networked computing entities, or components, interconnected by segments of the network. A component is a computing entity, such as a server, that is invoked to provide the service, and may interconnect with other servers for providing the service. The interconnection of components and segments associated with a service is often tracked by logging or "sniffing" transmissions (packets) sent between components (nodes) of the network. Flow data, including statistics about the data sent over the segments between the nodes, is often gathered as a barometer of network health. Tracking of metrics such as traffic volume (bytes), TCP retransmissions (RTX), network round trip time (RTT) and TCP resets often pinpoint problems and anomalies with specific segments and components.

SUMMARY

An automated service discovery and monitoring utility employs automatically generated analytics (rules) for monitoring network health of a service based on network discovery, using flow data derived from transmissions sent over segments between computing components defining the service. An interactive discovery application employs flow data based on network transmissions associated with a service to generate graphical renderings of the service network. Analysis of the flow data identifies associated components from inspection of the transmissions sent on each of the segments emanating from a particular component. Iterative selection of included components allows network traversal of components using the graphic rendering based on flow data of the segments used for providing the service rendered or transmitted to users. Automated generation of monitoring policies is based on the discovered segments and components. User selection of available policies is made from among available policy entries generated from the discovered segments and applied to selected metrics of subsequent transmissions.

The components thus represent one or more computing entities or hosts. Each segment represents the unique flow of data between two such components, one each in the role of client and server whereby the hosts of the client component interact with the hosts of the server component using a well-defined protocol, server port, or application. The combination of the two components and the protocol, server port or application linking them is sufficient for determining whether the segment is a necessary part of the service. Through the interactive process discussed further below, the service network discovery process is graphically rendered as a segment graph depicting the relationships between the components and segments. The graphic service mapping assists in iteratively identifying additional components for inclusion in the service. This graphical rendering depicts the components as nodes and the segments as edges.

Conventional tools provide a mechanism for monitoring network services, but in general these tools are heavy, complex to set-up, application-specific, and are targeted at the performance of the servers involved. Configurations disclosed herein provide value by employing existing flow data for monitoring how well the network is delivering the service. Further, conventional approaches accomplish monitoring via individually defined policies and reports on the various components of the service, while in contrast, typical users are interested in a framework in which the service is defined as a complete entity making it easy to manage polices and reports in the context of the service as a whole.

Configurations herein are based, in part, on the observation that setting up policies, or rules, tends to be a time consuming, repetitive task because of the need to identify and enumerate each of the components, or nodes, providing the service to be monitored, and to enter each of the segments (interconnections) for which a particular metric is to be measured. Conventional approaches to automated discovery typically rely on topology, which identify the physical connections between components but not flow data of the actual traffic sent on the segments between the components, which may traverse multiple physical components. The same physical connections and physical components are generally utilized by numerous logical services, and a single logical service utilizes many physical connections and components. The physical topology has little bearing on the logical service interconnection, thus is a poor substitute for targeted service monitoring.

Unfortunately, therefore, conventional approaches to flow monitoring typically require substantial manual entry for 1) definition of the components and segments providing a particular service, and 2) for defining the individual policy entries to monitor a specific metric on a particular segment. Conventional approaches are burdened because, without discovery, the user must "know" the service and just enter the definition into the system which will then monitor it. Unfortunately, "knowing" a service can be problematic because the staff that originally installed the service are gone, the service has changed but documentation was not updated to reflect the changes, or documentation simply does not exist. Often, the service network employs components on the "back end" that may not be readily identifiable. Policy definitions addressing these components are tedious and time consuming to develop. Further, many policies differ only slightly from other policies, due to similarities such as parallel servers and monitoring for differing metrics on the same segment. Policy definition therefore often requires substantial repetition.

Accordingly, the methods of policy configuration herein substantially overcome the shortcomings of conventional flow analytics by providing an interactive service discovery that identifies associated components (clients and servers) based on flow data, rather than topology, renders the flow data to allow a user to make an informed selection of a component for inclusion in a service, and generates a set of policies (rules) based on the discovered service dependencies for monitoring various metrics for each of the components and interconnecting segments invoked for providing the monitored service. Configurations disclosed herein provide an interactive discovery and monitoring utility for identifying each of the components and segments involved in providing a particular service. A user, such as an operator, explores the network during the discovery phase to identify, in an iterative manner, all the segments emanating from a particular component. The gathered flow data is used to determine the complete set of potentially interesting or significant segments. A single segment will typically refer to multiple individual flows. The segments are displayed along with metrics for selection of the segments associated with the service, using the metrics as an indicator of the components of the service. The discovery phase results in a service map indicating each of the relevant components and segments of the service. Individual monitoring policies are created by selecting particular metrics of interest and generated using the segments and metrics for monitoring, thus substantially reducing the time to define a service and enable monitoring. This interactive, graphic service discovery as disclosed herein therefore provides a significant benefit to help operators determine the moving parts of a service, as often the back-end dependencies are neither known nor documented.

Automated generation of monitoring policies is based on the discovered segments and components. User selection of available metrics is made from among available metrics and policies are generated from the discovered segments and applied to selected metrics of subsequent transmissions. For segments involving end users, policies are generated per geographic location in addition to the segments and selected metrics.

All end-users of the service are typically represented as a single component in the service. The configuration herein automatically defines separate policies for each group of users at distinct geographic locations. Such location based policies enable the operator to quickly identify if problems are affecting all users or just users at particular branch or remote offices. The automatic creation of such location based policies drastically reduces the complexity of creating and monitoring the service for the user.

In the examples depicted below, a method for mapping a service provided by the computer network includes identifying flow data based on the nature and source of the data carried over the segments, such that the flow data is based on a metric and a value of the metric, and providing a graphical means of mapping of components and segments providing the service, in which each of the components is connected by at least one segment to another one of the components, and the segments are indicative of the data flow between the components.

In operation, the interactive rendering allows selection of a first component, and determining a list of available relationships, or associations to other components, based on data flows involving the component. An interactive selection chooses the applicable subset of the available relationships, and a discovery application determines additional components for all chosen relationships. For each chosen relationship, the application creates a new segment that includes the first component, a new component and the chosen relationships. Subsequent segments and components are iteratively added to build up the service map. Upon selection of all components in the service, the discovery application generates, from the graphic service mapping (as depicted in FIG. 2 below), a set of policies responsive to anomalies in the mapped service, such that each policy is based on a particular segment and metric for monitoring, and the anomalies are defined by alerts indicating a deviation in flow data based on an expected value indicative of need for corrective action.

Alternate configurations of the invention include a multi-programming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1A:
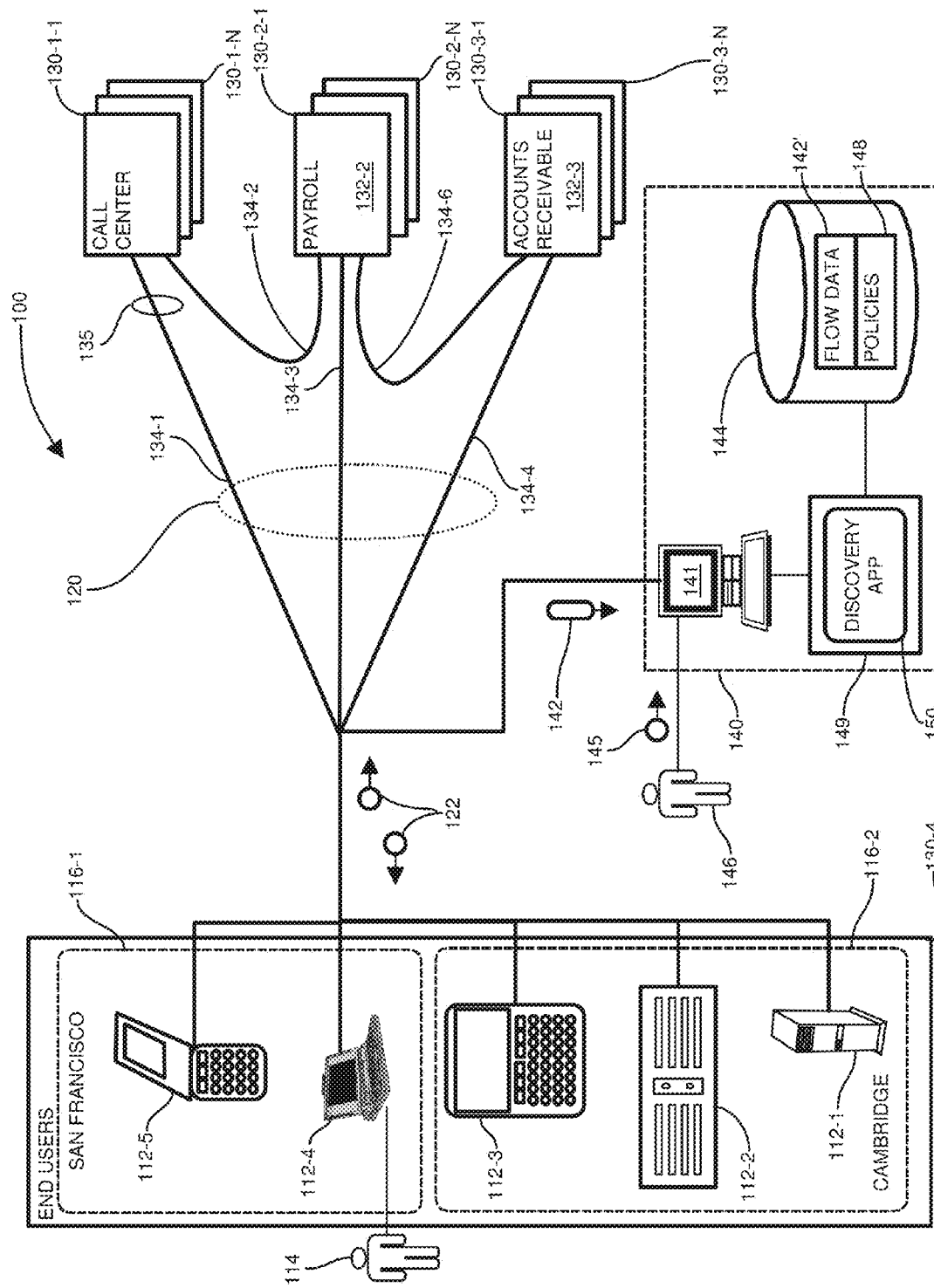
FIG. 1a is a context diagram of a network services environment supporting multiple services suitable for use with configurations disclosed herein.

Depicted below is an example configuration of a network responsive to the disclosed discovery and monitoring approach. In the example arrangement, a discovery server coupled to the service network executes a discovery application. The discovery application performs a discovery phase for analyzing previously gathered flow data to identify available segments, components, and metrics for monitoring, and then performs a monitoring phase in which the available monitoring policies (policies) are invoked on the discovered service network. The service definition (service) defines a set of components and segments, and the discovery phase, or discovery "wizard," guides the user through a series of steps to discover the components and segments involved in the service.

A service is defined as a set of components connected by segments. Each component is defined as a set of hosts (either individual IP addresses, or CIDR (Classless Inter-Domain Routing) blocks). Each segment is defined as a client component, a server component, and the server ports or applications used by the client component to connect to the hosts, or servers in the server component In an example arrangement disclosed further below, the discovery phase may include the following:

1. Define a front end component—normally the user (operator) knows the names or addresses of some front end servers and this is defined as the starting point for the service discovery 2. Discover the apps/ports served by the front end component to end users. A query is performed over any suitable timeframe to determine what apps/ports were actually in use.

3. Define one or more front-end segments by selecting apps/ports that were discovered and naming them as segments.

4. Discover and define back-end segments (user may repeat as necessary for each component):

a. Starting from any component, run a discovery query to find the apps/ports this component uses to connect to other back-end servers, or the apps/ports that other users or back-end servers use to connect to this component.

b. For each app/port discovered, automatically determine the servers that are serving that app/port to the original component, or the clients that are using the app/port served by this component c. Present the discovered results to the user, allowing the user to create new components and segments to further expand the definition of the service It should be noted that step 4 may be repeated multiple times by the user in an iterative manner to traverse the network. In Step 4c, if the discovery application finds that a discovered app/port and the servers involved are part of the service, both a new segment and a new component may be created. The new component is now eligible for further discovery.

Once the discovery application has defined the service components and segments, the user proceeds define what metrics are to be monitored on each segment. The discovery application 150 allows the user to at any time add additional components or segments to the service manually without using discovery if the definition is already known. These new components may in turn be used for further discovery. The set of possible metrics is common across all services to enable aggregation of health of a service or all services by metric.

For each metric enabled for a segment, the system will instantiate a policy to monitor that metric, using the definition of the client component, server component and the apps/ports involved as the criteria for the policy. For "front-end" segments, those segments where the client component is an end-user component, a policy will be created for each location, discussed further below.

Components representing end users receive further processing to denote a geographic location or other suitable subdivision. In the example arrangement, locations are typically defined by IP or CIDR blocks, so IP address may be employed. The end-user component defines the IPs/CIDR of the set of all users that should be monitored. This set is then segmented according to the location definitions or other suitable criteria depending on the user base. Thus, the user defines a single end users component to represent all the end users of the service, even though these users are likely distributed to many separate geographical locations. Therefore, the end-user component defines the IPs/CIDR of the set of all users that should be monitored. This set is then segmented according to the location definitions. For example, all end-users may be 10.0.0.0/8 (which is 10.0.0.0 to 10.255.255.255), Boston is 10.1.0.0/16 (10.1.0.0 to 10.1.255.255), and San Francisco is 10.2.0.0/16 (10.2.0.0 to 10.2.255.255)

Alternatively, more than one end user could be created, if users wanted to track multiple sets of users, independent of location, separately, for example. In general, it is preferable to monitor each location separately, as aggregating statistics from multiple locations leads to poor error bands for monitoring.

The end users component is flagged specially as representing "end-users" and thus will automatically be broken out by-location when policies are defined. The list of locations to monitor is common across all services for policy monitoring selection. The shared location list also enables aggregation of the health of a single location across all services.

Figure 1B:
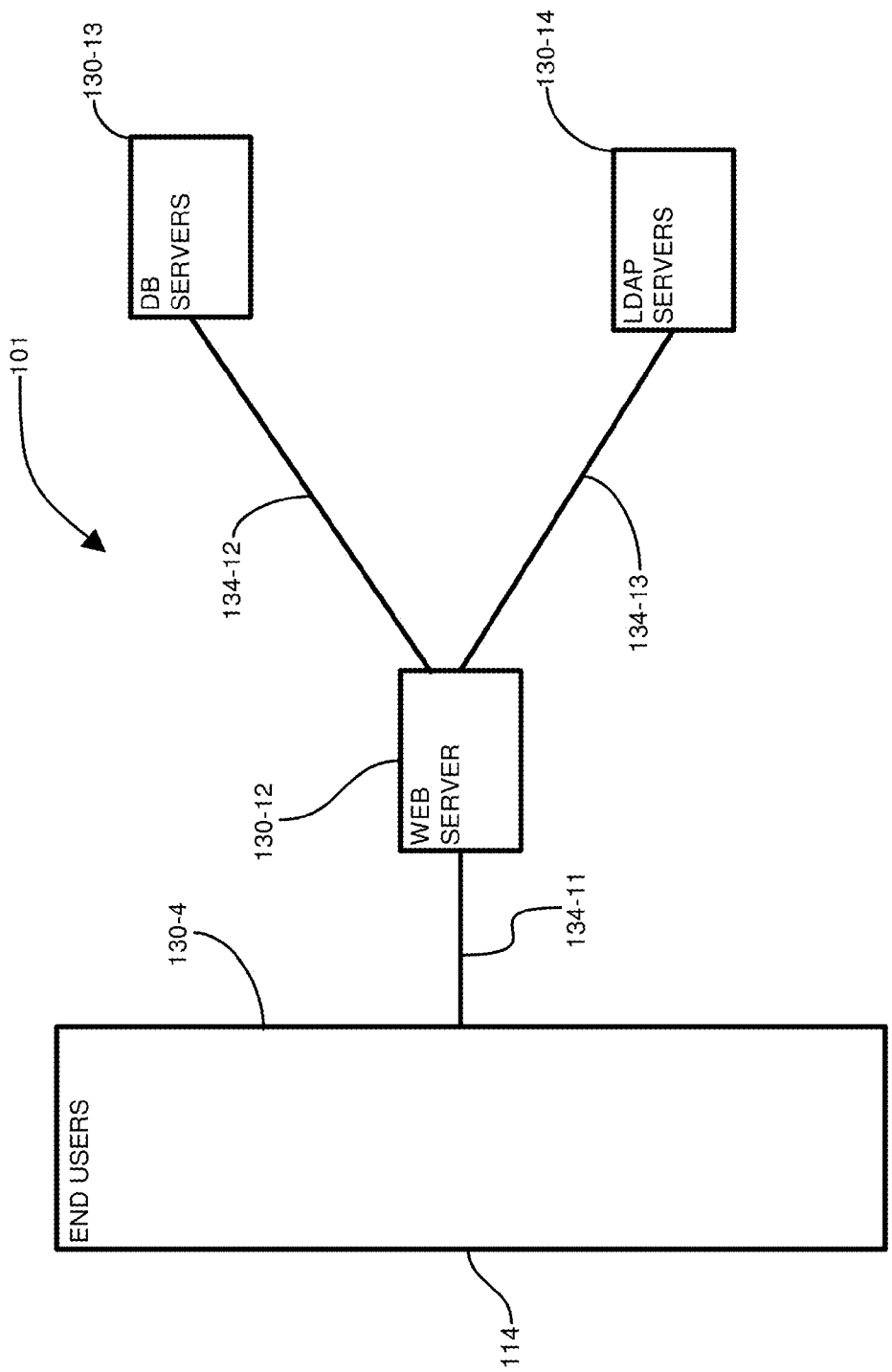
FIG. 1b is an example rendering of a graphic service mapping of a service in the network of FIG. 1.

FIG. 1a is a context diagram of a network services environment supporting multiple services suitable for use with configurations disclosed herein, and FIG. 1b is an example graphical service map of a service in the environment of FIG. 1. Referring to FIG. 1a, a network services environment 100 interconnects a plurality of services 132-1 . . . 132-3 (132 generally), each having one or more components 130-1-1 . . . 130-3-N (130 generally) with user devices 112-1 . . . 112-5 (112 generally). Each user device 112 serves one or more users 114, and includes common computing devices such as desktop PCs 112-1, interactive set-top boxes 112-2, personal digital assistants (PDAs) 112-3 and similar lightweight devices, laptops 112-4, and cellphones 112-5. Various other end-user devices may be applicable, and may employ wired and wireless (e.g. WiFi) connections to the web servers 110.

The end users 114, denoted collectively as component 130-4 based on a user aggregation function discussed further below, are typically employees of a common corporation or enterprise, possibly distributed over geographically diverse sites (116-1, 116-2), and invoke a transport network 120 for providing services for the normal course of business or daily activities. The transport network represents the underlying network infrastructure on which the service network operates, and therefore depicts the physical arrangement of computing nodes, connection mediums and switching equipment such as routers upon which the components and segments of the service network reside. The example network services environment 100 provides three services, supporting call center operations 132-1, payroll 132-2, and accounts receivable 132-3, each supported by a respective set of components 130-M-N. FIG. 1b denotes an example component mapping of the service network 101 that performs the functions for delivering the call center service 132-1 of FIG. 1a. Similar service networks having respective components exist for the other services 132-2 and 132-3. A particular network (interconnected components 130-1 . . . 130-4) may support multiple services, and each service may employ any number of components. In general, the components 130 of a particular service 132 represent different clusters of servers that perform distinct functions but all are required to deliver the service 132 to the end users 116. It should be noted that the same physical network (and often some of the same server hosts, such as web servers) are used to deliver multiple services, each of those services comprised of multiple components 130. In the example network shown, each service is shown on a particular set of components such that each service 132 could encompass multiple other components 130-N-M. The services 132 therefore emanate from a set of one or more components, 130-1 . . . 130-3 (130 generally), and may address functions such as call center operation 132-1, payroll 132-2, and accounts receivable 132-3, to name several. Each service 132 typically includes at least one front end component 110 and at least one server component 130, and often invokes other components 130 within the transport network 120. Generally, the service network 101 defines the infrastructure for transport between the components, and may include additional components 130, abridged here for simplicity. In the example arrangement, shown in FIG. 1b, the transport network 120 simply connects the web server to each of the components 130. Each of the components 130 interconnects by segments 134-1 . . . 134-4 (134 generally, shown below in FIG. 1b) for transporting messages 122, as is common in packet switched networks such as the Internet. Each segment interconnects two components 130, and defines a flow that includes a client and server port, representing the recipient and source of the flow.

A console or management station 140 monitors and stores flow data 142 in a repository 144 by recording metrics 135 of the message traffic 122 over the segments 134. The flow data 142 includes metrics such as bytes transported, retransmissions (RTX), round trip time (RTT), and resets over a segment, and records statistical data according to segment 134 and component 130. An operator 146 invokes queries of the repository 144 via an interactive screen 141 for interrogating the stored flow data 142' to analyze and diagnose network health. In configurations herein, a discovery server 149 executes a discovery and monitoring application 150 for identifying the components 130 and segments 134 associated with a particular service 132, and automates policies 148 for monitoring the metrics and identifying anomalies when the metrics deviate from an established norm, possibly indication a network health issue requiring attention.

FIG. 1b is an example rendering of a graphic service mapping (service map) of the call center service 132-1 in the network 100 of FIG. 1. The graphic service map is generated (built) by the user through exploration of the network based on the flows emanating from each component, discussed below. Each server or server cluster defines a component 130-N, and each interconnecting segment 134 defines a flow (each segment potentially can depict two unidirectional flows). The end users 116 may also represent multiple components 130, possibly too numerous to be displayed individually. End users 112 are therefore rendered as a single component 130-4, which may be subsequently distinguished based on criteria such as location or function, discussed further below.

Figure 2:
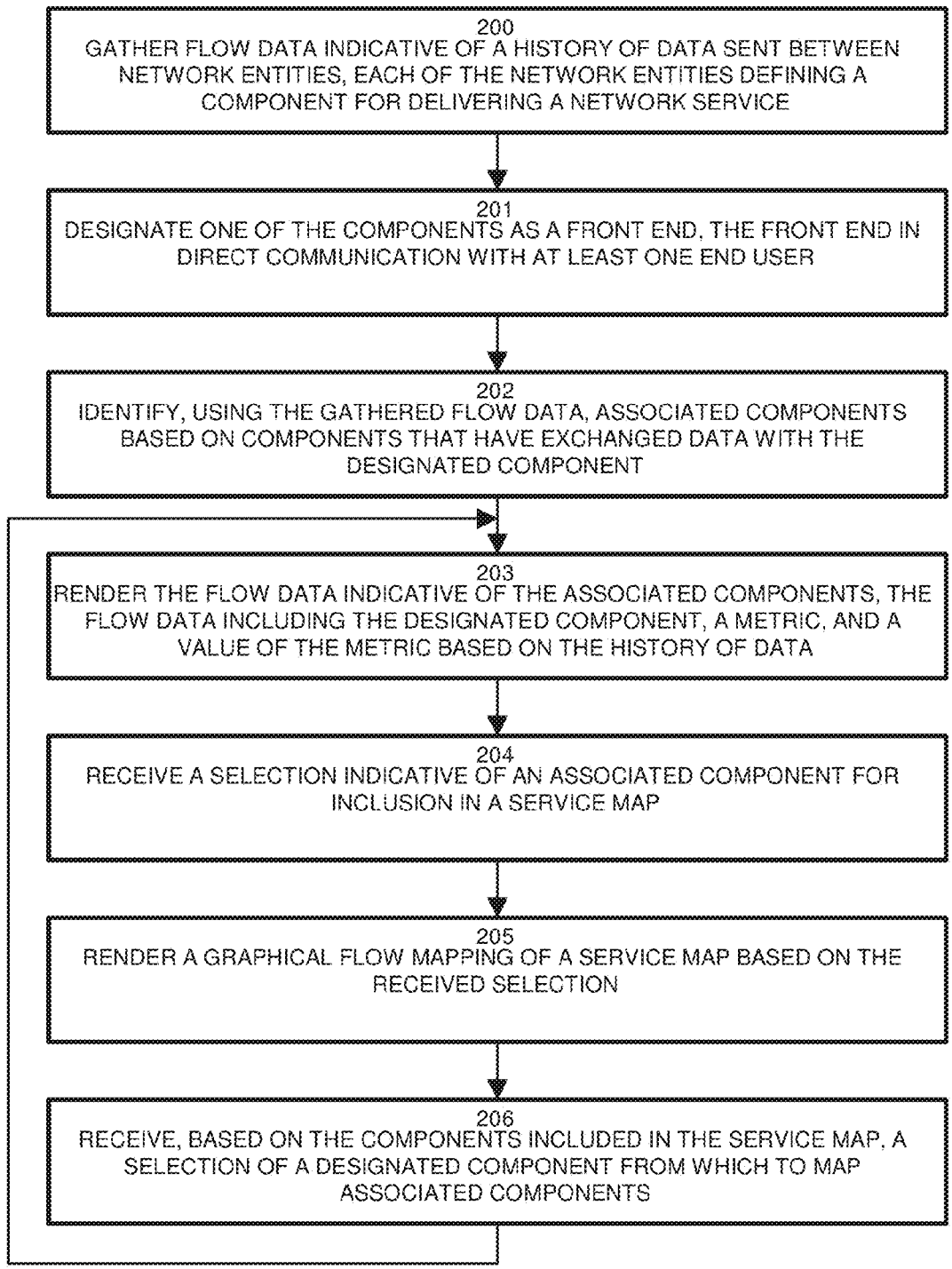
FIG. 2 is a flowchart of service discovery in the environment of FIG. 1.

FIG. 2 is a flowchart of discovery in the environment of FIG. 1. Referring to FIGS. 1 and 2, the disclosed method of mapping services in a computer network environment 100 includes, at step 200, gathering flow data 142 indicative of a history of data sent between network entities, or hosts, such that each of the network entities including one or more hosts defines a component 130 for delivering a network service 132. The network entities reported by the flow data are hosts, and a component 130 is a group of one or more hosts. The flow data 142 itself need not refer to components 130, but rather the discovery application 150 analyzes the flow data 142 and based on this analysis proposes an appropriate component 130 definitions to the user. In the manual process, the user is responsible for determining the list of hosts that perform the same logical function and group them together as a component. In this system, analysis of the flow data automatically determines the best grouping and builds components accordingly. A user or operator 146 designates one or more of the components 110 as a front end, in which the front end is in direct communication with at least one end user 114, as depicted at step 201. Designation of the front end 110 provides a starting point for the discovery process, as often this is one of the few components that are known to the operator 146. Mechanisms disclosed herein are operable to perform the discovery sequence beginning from any component, however the front end is deemed to be more mnemonically familiar to the operator 146.

The discovery application 150 identifies, using the gathered flow data 142, associated components 130 based on components 130 that have exchanged data with the designated component 130, as disclosed at step 202. Flow data 142 previously gathered for network traffic is stored 142 in the repository 144. The display 141 renders the flow data 142 indicative of the associated components 130, as depicted at step 203, such that the flow data includes the designated component 130, a metric 162 (FIG. 3, below) such as a byte count, and a value of the metric based on the history of data 142. The metrics 162 allow inference of associated, or connected, components that are part of the service 130 by observing metrics with significant values. Administrative or trivial connections that lead to nodes that are not associated with the service will likely have substantially fewer metric counts, allowing selection of only components 130 in the service.

The discovery application 150 receives a selection indicative of an associated component 130 for inclusion in a service map, as depicted at step 204, thus adding the component 130 to the service 132. The display 141 renders a graphical flow mapping of a service map based on the received selection, as disclosed at step 205, shown below in FIG. 3. The discovery application 150 then receives, based on the components 130 included in the service map, a selection 145 of a designated component 130 from which to map associated components 130, as shown at step 206. From the graphical flow mapping depicting segments 134 representing data flow, or associations, between components 130, the operator 146 may now view additional components 130 associated with the newly added component, and iteratively traverse the service network 101 for identifying all components 130 and segments 134 in the service, as control reverts to step 203 until the service is fully discovered.

Figure 3:
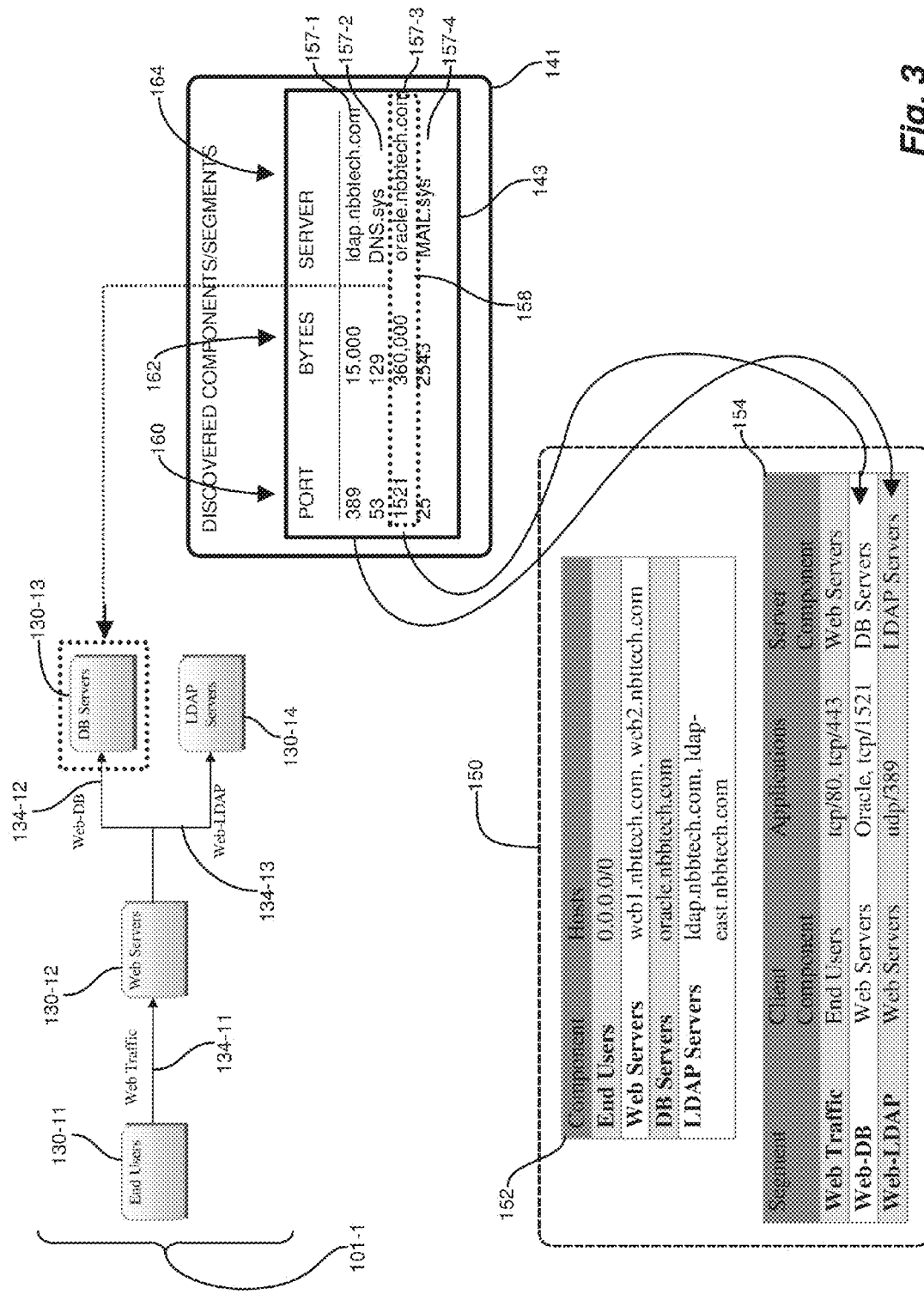
FIG. 3 is a block diagram of service discovery in an example network as in the environment of FIG. 1.

FIG. 3 is a block diagram of service discovery in the environment of FIG. 1. Referring to FIGS. 1 and 3, an example service network 101-1 for supporting database access includes components 130-11 . . . 130-14 and segments 134-11 . . . 134-13. The discovery and monitoring application (application) 150 maintains a component list 152 and a segment list 154 for accumulating and populating discovered components and segments, respectively. Although the example shows the lists 152, 154 fully populated, accumulation is an iterative process, as discussed further below, beginning with (usually) a front end node serving the end users, such as web servers 130-12 in the example shown.

The discovery application 150 employs gathered flow data 142' (flow data 142 that has been stored) from the repository 144 to identify data flows emanating from a component 130 and renders a potential segment list 143 on the interactive display 141 for review and selection by the operator 146. From the starting node 130-12 (Web Servers), the application 150 identifies entries 157-1 . . . 157-4 (157 generally) reflecting the data flows from the web servers 130-12 based on flow data 142' matching the web server host name entry in the component list 152. Each entry 157 includes fields for a port 160, byte count 162, and a server (destination) 164. Alternatively, other metrics other than byte count may be employed to characterize the flows, such as bit rate, retransmissions, etc. From visual inspection of the discovered flow entries 157, the operator 146 makes an informed selection of associated segments 157 and components 164 (servers) to be included in the discovered service. While the hosts that define the component may or may not be named to mnemonically correspond to the service they represent, the port identified is deterministic of the application from which a particular flow emanates. At this point in the process, the system has grouped together similar hosts into a prototype component (a single row in 143 may have multiple hosts in the server column). For example, the host name may be something LDAP related such as "ldap.n-bttech.com", but it could also be some unrecognizable name. The system therefore does not seek to identify the servers as LDAP based on the name; instead it lists the servers that it found that are using the same server port 389 in this case. It is the port column which we know to be the LDAP port, and thus this column 160 will list the port number and the well-known port name (ldap). The user must examine the combination of the port and the hosts in the server list to determine that this row represents "LDAP" traffic. Combined with the fact that this row relates to the discovery process initiated from the "Web Servers" component, this becomes the "Web-LDAP" segment.

Therefore, since the port 160 is typically indicative of an application of usage of the flow, as just described, the user identifies entry 157-1 as an LDAP server, based on the byte count 162 reflecting traffic, the port indicating LDAP usage, and the remote server 164 name. Similarly, entry 157-3 is attributed to Oracle® database usage, also based on byte count 162 and port 160. A selection bar 158 designates operator 146 selections. The other flows reflected by entries 157-2 and 157-4 are related to administrative and housekeeping operations for DNS (domain name services) and mail, and can be verified by byte count and port to be unrelated to the discovered service 101-1 for database access. In contrast, conventional topology based approaches to discovery would indicate such ancillary and minor data flows as valid connections, thus requiring operator investigation to ascertain which topology connections are directly related to the service. The rendered fields for port 160, byte count 162 and server 164 distinguish entries 157 representing data flows 142 that are part of the service 101-1. Further, the entries 157 may be sorted on byte count to filter insignificant flows from the display 141.

As indicated by the selection bar 158, the application 150 adds component 130-13 to the service in response to user selection. Segment 134-12 is likewise added as the transporting flow. The display 141 permits selection of another component 130 from which to continue discovery and accumulate additional components. Additional flow data based on traffic emanating from the selected components 130 is presented in an iterative manner as a potential segment list 143 emanating from the GUI selected component 130 until each component 130 and segment 134 in the service is discovered.

Figure 4A:
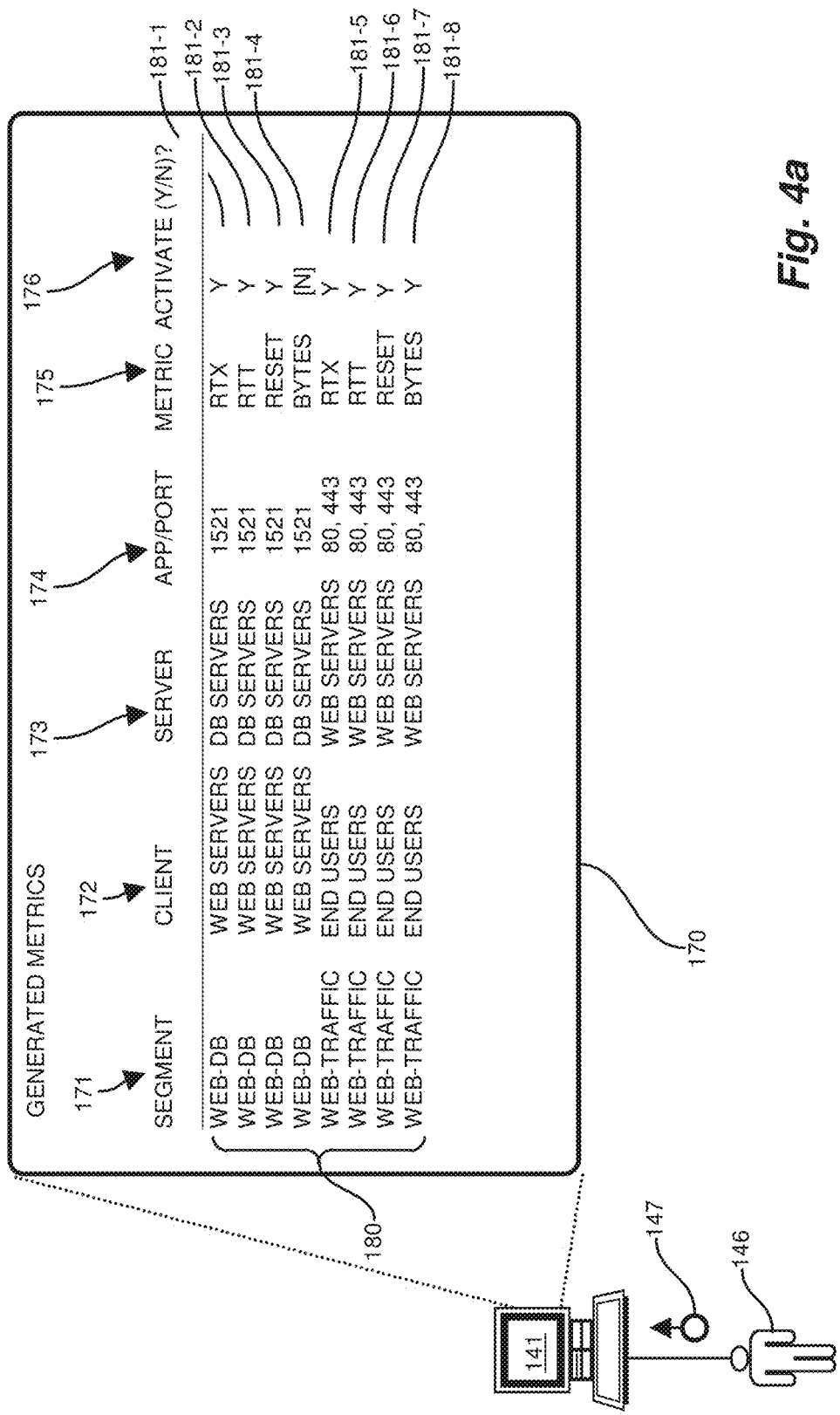
FIGS. 4a and 4b are diagrams of monitoring the service discovered in FIG. 3.
Figure 4B:
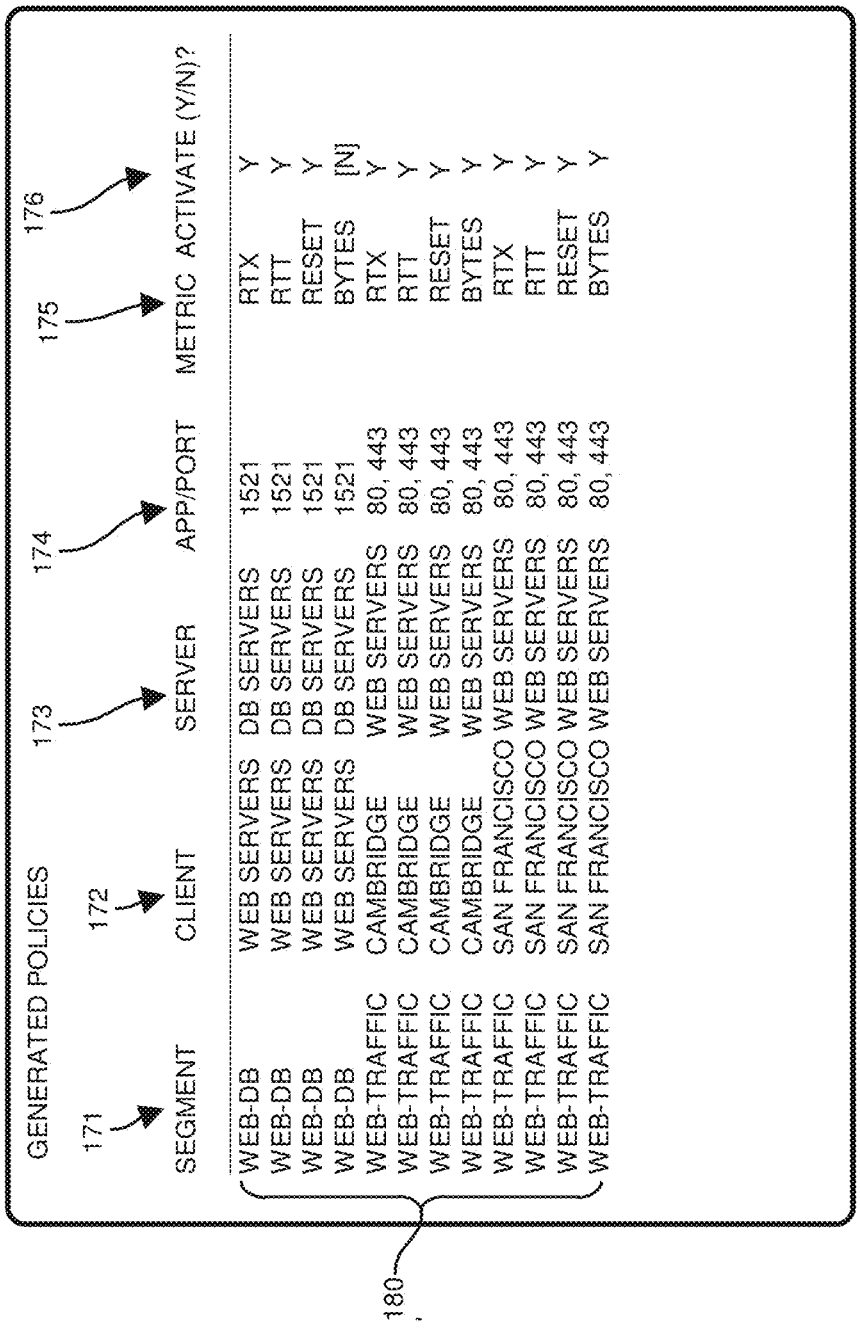

FIGS. 4a and 4b are a block diagram of monitoring the service discovered in FIG. 3. Referring to FIGS. 3, 4a, and 4b following discovery of the components 130 and segments 134 in the service, the display 141 renders a metric selection list 170 of available segments 180 and policies for monitoring the discovered service network 101-1. The available segments 180 include entries 181-1 . . . 181-N (181 generally) that represent available segments 171 for monitoring, and the metrics 175 available for monitoring. Other fields displayed for each entry 181 include the client 172 and server 173 of each segment (source and destination), the port 174, and hence the application, to which the segment carries traffic, and a selection 176 of whether monitoring should be enabled for the segment 171 and metric 175. Initially, the available segments 180 include all segments and metrics for which flow data 142 is captured, but it is likely that the operator 146 will not want to burden the system with all possible segments. Rather, the operator selects 147 entries 181 for the segments 171 and metrics 175 desired for monitoring, generally expected bottlenecks and segments approaching capacity.

The operator 146 selects entries 181 using the activation field 176, and threshold monitoring commences on each selected segment 171 for the selected metric 175. In the example shown, the operator enables "Y" for each entry except for entry 181-4, via selection 147, to disable monitoring of byte count on segment WEB TRAFFIC. Since a large and widely varied quantity of data is carried on this interface, an absolute byte count is not consistent enough to base a reliable alarm (alert), and instead retransmit (RTX) counts will indicate network saturation.

FIG. 4a applies available metrics to the discovered components and segments for monitoring. The list described in FIG. 4a refers to the user selection of metrics to monitor on segments. In this step the user is not directly selecting the policies, but only the important metrics. FIG. 4b depicts the resulting policies 180' that correspond to the selected metrics 180. Referring to FIGS. 1 and 4b, in the case of end user components, shown in FIG. 4b, segments may correspond to multiple policies due to "location breakout" that defines geographic or other enumeration of end users. For front-end segments, therefore, there will be 1 policy per location per metric. In the examples herein, the end user component 130-4 results in policy definitions for users in San Francisco 116-1 and Cambridge 116-2. Thus a system with 2 locations defined and 4 metrics, there will be 8 policies created.

As indicated above, monitoring triggers an alert when the metric deviates significantly from the expected value, as determined from previous flow data 142. In particular configurations, a static alert threshold may indicate deviant operation. Alternate configurations employ analytic policies, which may not involve predetermined thresholds. Such an analytic policy continuously monitors the traffic matching the segment criteria and builds a complex statistical model. Alerts are triggered when the metric deviates significantly from the value predicted by the model. Other policy types in addition to static thresholds and analytic models may be employed in alternate arrangements.

Figure 5:
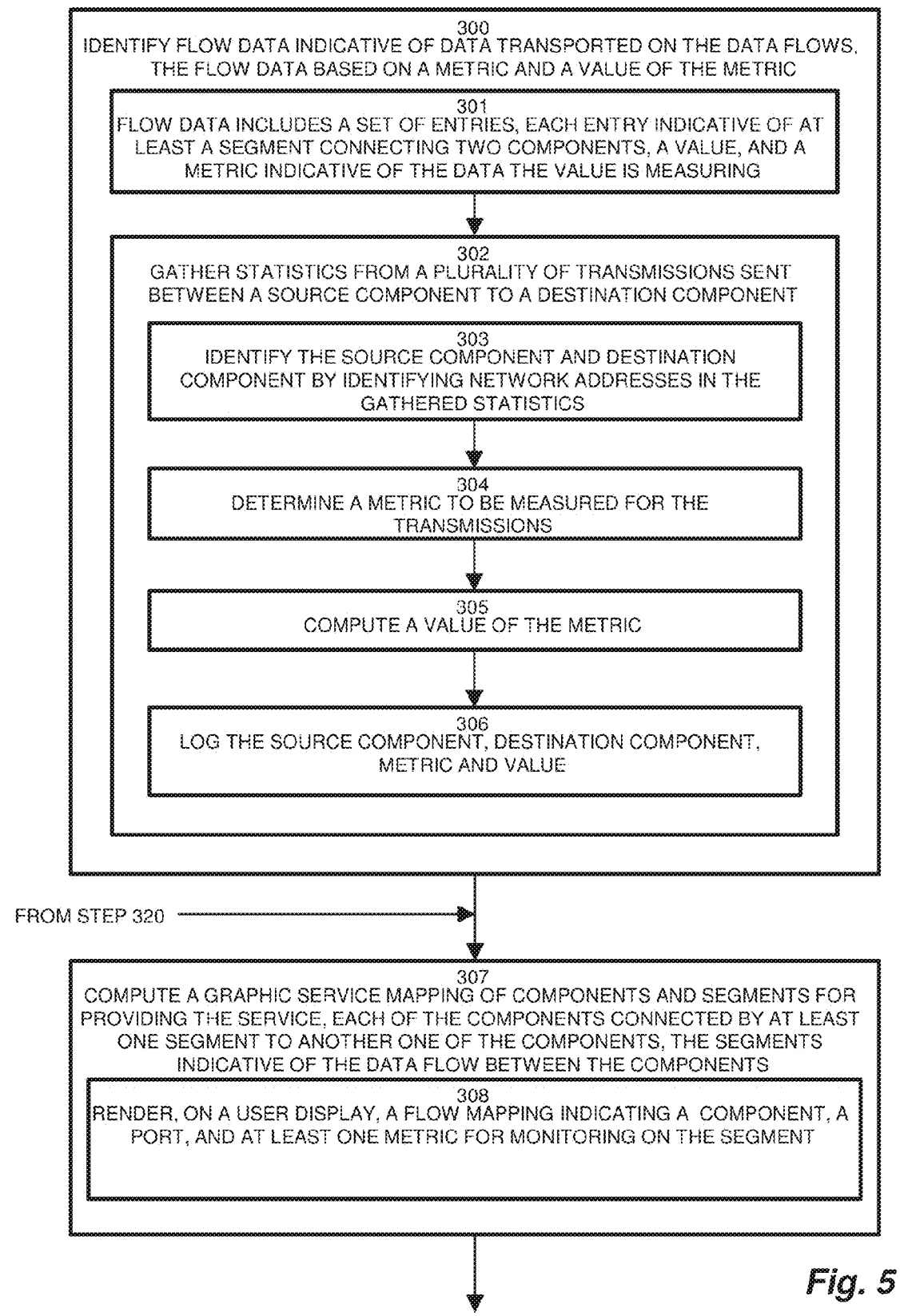
FIGS. 5-7 are a flowchart of service discovery and policy generation as in FIGS. 3-4.
Figure 6:
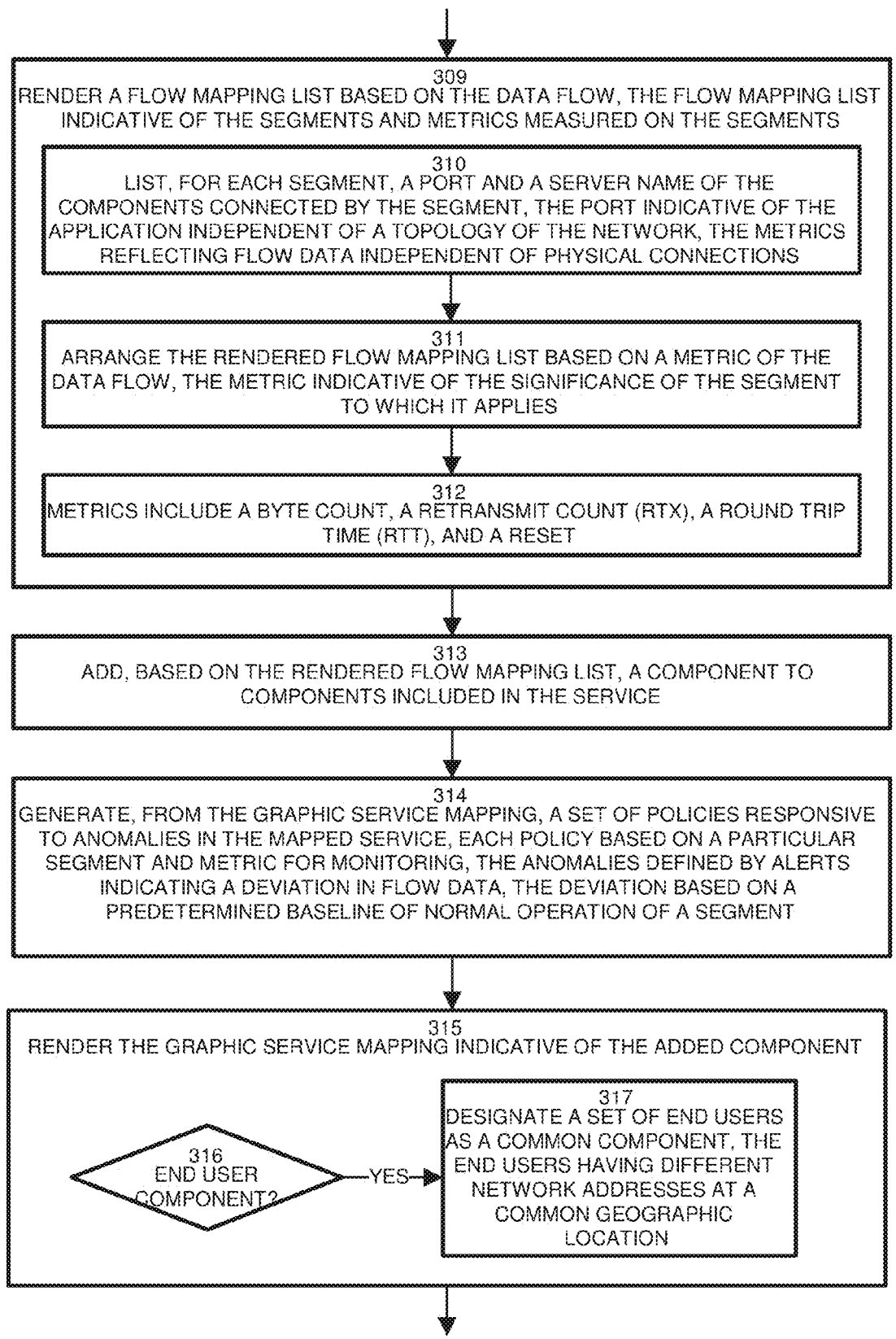
Figure 7:
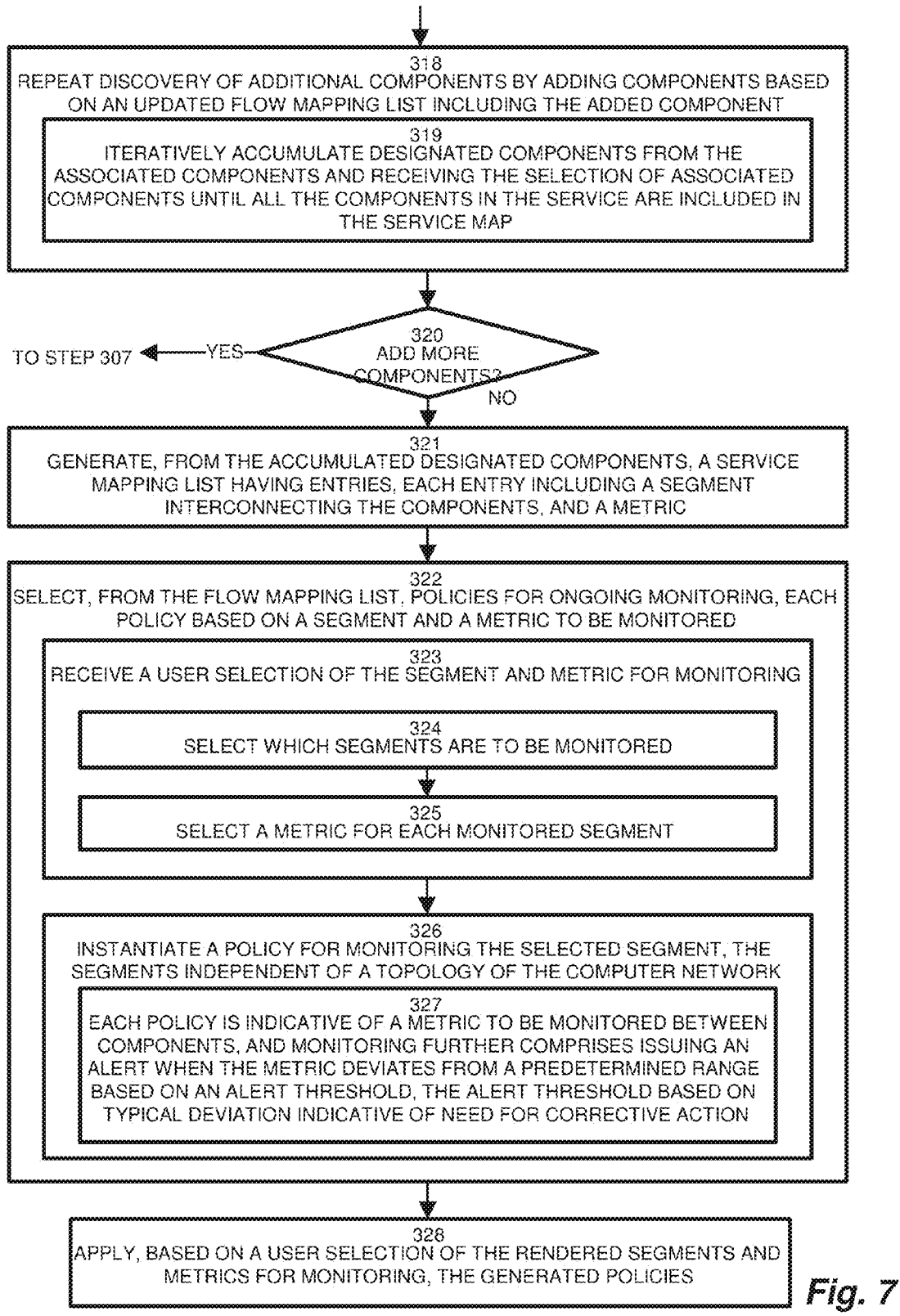

FIGS. 5-7 are a flowchart of service discovery and policy generation as in FIGS. 3-4. Referring to FIGS. 1 and 3-8, in the service network 101-1, corresponding to the graphical service mapping 101 of FIG. 1b, for providing services to end users 114 and provided by a series of data flows 134 between computing components 130 in the network, the method for mapping a service provided by the computer network as disclosed herein includes identifying flow data 142 indicative of data transported on the data flows, or segments 134. The identified flow data is based on a metric 162 and a value of the metric, as depicted at step 300. The flow data 142 includes a set of entries, such that each entry 157 is indicative of at least a segment 134 connecting two components 130, a value, and a metric 162 indicative of the data the value is measuring, as depicted at step 301.

In the example arrangement shown herein, identifying the flow data 142 further includes gathering statistics from a plurality of transmissions sent between a source component 130 to a destination component 130, as disclosed at step 302. The discovery application 150 identifies the source component 130 and destination component 130 by identifying network addresses in the gathered statistics, as depicted at step 303. The discovery application matches network identifiers such as IP addresses. In alternate arrangements, other identifiers could be used, depending on platform and protocols employed, such as MAC addresses to identify message traffic emanating from or received by a particular node component 130 (node). The use of IP addresses, as in the example arrangement, defines the components as nodes in the network 120 as well as message traffic sent or received by a particular component. For each segment 134, the application 150 determines a metric 162 to be measured for the transmissions, as shown at step 304. Typical metrics include byte count, retransmit (RTX), round trip time (RTT) and reset. The application 150 computes a value of the metric, as shown at step 305, and logs the source and destination hosts corresponding to the source component and destination component, metric and value, as depicted at step 306, for aggregating (accumulating) each of the entries for a segment 134 between components 130. The raw flow data 142 identifies hosts (IP addresses), not components as the discovery application 150 has not yet identified the hosts that define a component 130, since the flow data does not specify components, only hosts. The system logs the flow data 142 by source and destination host, and on demand queries for all flows that match a given segment—that is one host matches the client component, and one host matches the server component and the port/application matches the segment. The discovery application 150 therefore qualifies multiple flows traversing a segment 134 between hosts based on the port/application identity that denotes the type of information carried on the flow.

The discovery application 150 computes a graphic service mapping 101-1 of components 130 and segments 134 for providing the service, such that each of the components 130 is connected by at least one segment 134 to another one of the components 130, in which the segments 134 are indicative of the data flow between the components 130, as shown at step 307. The graphic service mapping 101-1 is a graph representation of the service network 101 based on the accumulated flow data of the components 152 and the segments 154 based on the IP addresses between which the data is sent. Computing the graphical service mapping 101-1 includes rendering, on the user display 141, a potential segment list 143, indicates a component 164 (or server), a port 160, and at least one metric 162 such as a byte count for monitoring on the segment 134, as disclosed at step 308. The client/server notation reflects the data flow, and not necessarily the operations performed, thus the sender/receiver notation may be employed in alternate configurations.

Computing the graphic service mapping 101-1 further includes rendering the computed potential segment list 143 based on the stored flow data 142', such that the potential segment list 143 is indicative of the segments 134 and metrics 162 measured on the segments 134, as depicted at step 309. The computed potential segment list therefore displays potential segments as it is generated by analyzing the stored flow data 142', such that each row is an abstraction of multiple flows. Generating the potential segment list 143 further comprises listing, for each potential segment, a port 160 and a server 164 name of the components connected by the segment 134, in which the port is indicative of the application independent of a topology of the network 101-1, such that the metrics 143 reflect flow data independent of physical connections of the network. Conventional approaches to network mapping depict physical connections, rather than actual data flow, and thus give equal weight to trivial and mainstream connection. The metric 152, such as byte count, allows an operator to make an intuitive selection as to the contribution of the potential segment 134 to the service. Particular configurations may arrange the rendered flow mapping 143 list based on a metric of the data flow, such that the metric is indicative of the significance of the potential segment 134 to which it applies, as shown at step 311. For example, the entries 157 in the potential segment list 143 may be ordered on byte count 162, or other metric employed for distinguishing segments 134. In the example arrangement, the metrics may include a byte count, a retransmit count (RTX), a round trip time (RTT), and a reset, as depicted at step 312.

Based on the rendered potential segment list 143, the discovery application 150 receives an operator selection 145 of a potential segment 134 to add to the service 101-1. The application 150 adds, based on the rendered potential segment list, the selected potential segment 134 to segments 134 and component 130 to components 130 already included in the service, as depicted at step 313. The graphical service mapping 101-1 and accompanying potential segment list 143 allows informed operator selection of the components 130 included in the service, based on the values of the rendered metrics 162 (flow byte count, in the example shown). From the received operator selection 145, the discovery application 150 generates, based on the current state of the graphic service mapping 101-1, a set of policies 180 responsive to anomalies in the mapped service 101-1, such that each policy 181 is based on a particular segment 134 and metric 175 and a location for front end segments for monitoring, as depicted at step 314. The anomalies are defined by alerts indicating a deviation in flow data, in which the deviation is based on a detected anomaly of a segment 130.

Based on the component 130 added by the selection 145, the discovery application 150 renders the graphic service mapping 101-1 indicative of the added component 130, as shown at step 315. A particular caveat to component selection occurs with end users 114 at remote locations. A check is performed, at step 316, to determine if the added component relates to end users. If so, the discovery application 150 designates the set of end users 114 as a common component for end users 114 having different network addresses at a common geographic location, as shown at step 317. Since it is typical for end users to have distinctive IP addresses, the designation of each IP address as a separate component would likely clutter the display 141 unnecessarily. Accordingly, end users are grouped according to geographic location, rather than IP address. Therefore, the set of IP address based from each geographic location is displayed as an end user component. Geographic locations may be organized based on the distribution of the business enterprise, and may be specific to a site, city or state, depending on the granularity of the enterprise.

The discovery application 150 repeats the discovery process of additional segments 134 and components 130 by adding components 130 based on an updated flow mapping 143 list that includes the added component 130, as depicted at step 318. This includes iteratively accumulating designated segments 134 and components 130 from the associated segments and components and receiving the selection 145 of associated segments and components until all the components 130-N in the service and all the segments 134-M between components 130-N are included in the service network map 101-1, as shown at step 319. Another check is performed, at step 320, to determine if additional segments 134 and components 130 are to be added to the service, and control reverts to step 307 to update the graphical service mapping 101-1 and potential segment list 143 for selection 145 of additional segments 134 and components 130 to include in the service. In this manner, the operator 146 iteratively accumulates segments 134 and components 130 to the service by traversing the service network 101-1 on discovered segments 134 to build the set of components and segments providing the service. Intuitive feedback provide by the metrics and applications utilizing the flows allows elimination of nodes outside the service but which may have a trivial or coincidental connection, in contrast to a topology approach which would merely identify each physical connection, whether trivial or significant.

Following service identification of the components 130 and segments 134, the discovery application 150 generates, from the accumulated designated components 130 and segments 134, a metric selection list 170 having entries 181, such that each entry includes a segment 171 interconnecting the components 172, 173, and a metric 175, as depicted at step 321. The metric selection list 170 contains similar information to the potential segment list 143, and allows an operator 146 to select, from the metric selection list 170, policies for ongoing monitoring, such that each policy 181 is based on a segment 171 and a metric 175 to be monitored, as disclosed at step 322. One caveat is presented with respect to the end user component as discussed above. The policy list will have more policies if there are any segments attached to End User components. For each location based policy, the client column 172 would include the client component definition plus the location definition—such as "End Users in Boston. The discovery application 150 receives an operator selection 147 of the segment and metric for monitoring by identifying the entry 181, as depicted at step 323. The operator selection 147 thus indicates which segments 171 are to be monitored, (step 324) and selects a metric 175 for each monitored segment 171, as shown at step 325. The discovery application 150 initially creates a potential policy, represent by an entry 181, for each possible segment and metric, and the operator selection 147 removes policies for segments deemed to not require monitoring.

The discovery application, 150, following the selection at step 320, instantiates a policy 181 for monitoring each of the selected segments 134 and a location, such that the segments 171 are independent of the topology of the computer network 120, as shown at step 326. Since the segments are based on the transmitted data, rather than the physical connection, topology alone will not define a segment because a physical connection, absent any data flow across it, will not be shown as a segment 134. Each policy 181, therefore, is indicative of a metric 175 to be monitored between components, such that monitoring further comprises issuing an alert when the metric deviates from a predetermined range based on an alert threshold, such that monitoring further comprises issuing an alert when the metric deviates from some expected value indicative of need for corrective action, as depicted at step 327. The discovery application 150 then applies, based on the operator selection of the rendered segments and metrics for monitoring, the generated policies 181 to the service network 101-1 for ongoing monitoring, as disclosed at step 328.

Those skilled in the art should readily appreciate that the programs and methods for service network discovery as defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method of service network discovery has been particularly shown and described with references to embodiments thereof, it will be understood by those skilled in the art that various changes in form and details may be made therein without departing from the scope of the invention encompassed by the appended claims.

What is claimed is:

1. In a services delivery network interconnecting network components to associated components via segments depicting a relationship between the components, a method of discovering the services network comprising:
   receiving a designation of a component;
   mapping relationships between the designated component and other components using flow data gathered for data exchanged between the designated component and other components;
   inferring associated components of the designated component based on the mapped relationships;
   rendering a graphical depiction of associated components; and
   receiving a designation of an associated component from which to map additional components.

2. The method of claim 1 further comprising iteratively mapping associated components from the designated components until the graphical depiction includes each of the segments and components defining the services delivery network.

3. The method of claim 1 further comprising accumulating the segments in the services network from the received designations, each of the segments defined by a host component, a server component, and the corresponding relationship.

4. The method of claim 3 further comprising:
   generating, from the accumulated designated segments and components, a segment list having entries, each entry including a segment interconnecting the components, and a metric;
   selecting, from the segment list, metrics for ongoing monitoring; and
   generating, from the designated metrics, policies based on a segment and a metric to be monitored.

5. The method of claim 1 further comprising:
   rendering the graphical depiction on a visual rendering device, and receiving the designations of components from a user selection.

6. The method of claim 5 further comprising depicting the segments and components as a graph having components as nodes and segments as edges, the received designations defining a user selection of a relationship defining the segment to the associated node.

7. The method of claim 1 further comprising:
   gathering flow data indicative of a history of data sent between network entities, each of components including at least one the network entities for delivering a network service.

8. The method of claim 1 further comprising:
   designating one of the components as a front end component, the front end component in direct communication with at least one end user device; and
   designating a single component for end users having different network addresses at a common geographic locations.

9. The method of claim 1 wherein accommodating the segments further comprises listing, for each potential segment, a port and at least one server identity of the hosts connected by the potential segment, the port indicative of the application independent of a topology of the network, the metrics reflecting flow data independent of physical connections.

10. In a computer network for providing services to end users, the service provided by a series of data flows between computing components in the network, a non-transitory computer readable storage medium having logic encoded as instructions that when executed by a processor, perform a method for mapping a service provided by the computer network comprising:

identifying flow data indicative of data transported on the data flows, the flow data based on a metric and a value of the metric, computing a graphic service mapping of components and segments for providing the service, each of the components connected by at least one segment to another one of the components, the segments indicative of the data flow between the components; and generating, based on the identified flow data and the computed graphic service mapping, a set of policies responsive to anomalies in the mapped service, each policy based on a particular segment and metric for monitoring, the anomalies defined by alerts indicating a significant deviation in flow data, the deviation based on a predetermined baseline of normal operation of a segment and metric.

11. The method of claim 10 wherein identifying the flow data further comprises:

gathering statistics from a plurality of transmissions sent between a source component to a destination component;

determining a metric to be measured for the transmissions; computing a value of the metric, and logging the source component, destination component, metric and value.

12. The method of claim 11 wherein the flow data includes a set of entries, each entry indicative of at least a segment connecting two components, a metric, and a value indicative of the data the metric is measuring.

13. The method of claim 10 further comprising monitoring, based on the generated policies, by selecting which segments are to be monitored;

selecting a metric for each monitored segment; and instantiating a policy for monitoring the selected segment, the segments independent of a topology of the computer network.

14. The method of claim 13 wherein computing the graphic service mapping further comprises:

rendering a potential segment list based on the data flow, the potential segment list indicative of the segments, and indicative of the metrics measured on the segments;

adding, based on the rendered potential segment list, a segment to the segments and a component to components included in the service;

rendering the graphic service mapping indicative of the added segment and component; and repeating discovery of additional segments and components by adding segments and components based on an updated potential segment list including the added segment and component.

15. The method of claim 14 further comprising arranging the rendered potential segment list based on a metric of the data flow, the metric indicative of the significance of the potential segment to which it applies.

16. The method of claim 13 wherein computing the graphical service mapping further comprises:

rendering, on a user display, a service mapping list, the service mapping list indicating a sending component, a receiving component, the segment between the sending and receiving components, and at least one metric; and receiving a user selection of the segment and metric for monitoring;

applying, based on a user selection of the rendered segments and metrics for monitoring, the generated policies.

17. The method of claim 16 wherein the metrics include a byte count, a retransmit count (RTX), a round trip time (RTT), and a reset.

18. The method of claim 13 wherein each policy is indicative of a metric to be monitored between components, and monitoring further comprises issuing an alert when the metric deviates from an expected value indicative of need for corrective action.

19. The method of claim 10 further comprising identifying the source component and destination component by identifying network addresses in the gathered statistics.

20. A discovery server for mapping a service provided by the computer network comprising:

a repository for storing identified flow data indicative of data transported on the data flows, the flow data based on a metric and a value of the metric, a discovery server executing a discovery application for computing a graphic service mapping of components and segments for providing the service, each of the components connected by at least one segment to another one of the components, the segments indicative of the data flow between the components; and the discovery application further generating, from the graphic service mapping, a set of policies responsive to anomalies in the mapped service, each policy based on a particular segment and metric for monitoring, the anomalies defined by alerts indicating a deviation in flow data, the deviation based on a an expected value indicative of need for corrective action.

21. The server of claim 20 wherein identifying the flow data further comprises:

gathering statistics from a plurality of transmissions sent between a source component to a destination component;

determining a metric to be measured for the transmissions; computing a value of the metric, and logging the source component, destination component, metric and value.

22. The server of claim 20 wherein the discovery application is further configured to monitor, based on the generated policies, by:

selecting which segments are to be monitored;

selecting a metric for each monitored segment;

selecting, if the segment is associated with end users, the list of locations to be monitored, and instantiating a policy for monitoring the selected segment, the segments independent of a topology of the computer network.

23. The server of claim 22 wherein computing the graphic service mapping further comprises:

rendering a potential segment list based on the data flow, the potential segment list indicative of the segments and metrics measured on the segments;

adding, based on the rendered potential segment list, a segment to the segments and a component to components included in the service;

rendering the graphic service mapping indicative of the added segment and component; and repeating discovery of additional segments and components by adding segments and components based on an updated potential segment list including the added segment and component.

24. The server of claim 22 wherein the discovery server further includes a user display, the user display responsive to the discovery application, computing the graphical service mapping further comprising:

rendering, on the user display, a metric selection list, the metric selection list indicating a sending component, a receiving component, the segment between the sending and receiving components, and at least one metric for monitoring on the segment;

receiving a user selection of the segment and metric for monitoring; and applying, based on a user selection of the rendered segments and metrics for monitoring, the generated policies.

25. The server of claim 24 wherein each policy is indicative of a metric to be monitored between components, the metrics including a byte count, a retransmit count (RTX), a round trip time (RTT), and a reset; and monitoring further comprises issuing an alert when the metric deviates from a predetermined range based on an alert threshold, the alert threshold based on typical deviation indicative of need for corrective action.

* * * * *